INVENTOR
WILLIAM C. BROWN
BY Robert T. Dunn
AGENT

Feb. 21, 1967 W. C. BROWN 3,305,751

TRAVELING WAVE DEVICE

Filed Oct. 26, 1962 8 Sheets-Sheet 2

INVENTOR
WILLIAM C. BROWN

BY Robert T Dunn

AGENT

INVENTOR
WILLIAM C. BROWN
BY Robert T Dunn
AGENT

Feb. 21, 1967 W. C. BROWN 3,305,751
TRAVELING WAVE DEVICE
Filed Oct. 26, 1962 8 Sheets-Sheet 4

INVENTOR
WILLIAM C. BROWN
BY Robert T. Dunn
AGENT

TRAVELING WAVE DEVICE

Filed Oct. 26, 1962

INVENTOR
WILLIAM C. BROWN
BY
AGENT

INVENTOR
WILLIAM C. BROWN
BY Robert T Dunn
AGENT

SECTION AA

SECTION BB

SECTION CC

INVENTOR
WILLIAM C. BROWN

BY Robert T Dunn

AGENT

Feb. 21, 1967 W. C. BROWN 3,305,751

TRAVELING WAVE DEVICE

Filed Oct. 26, 1962 8 Sheets-Sheet 8

INVENTOR
WILLIAM C. BROWN

BY Robert T. Dunn

AGENT

United States Patent Office 3,305,751
Patented Feb. 21, 1967

3,305,751

TRAVELING WAVE DEVICE

William C. Brown, Weston, Mass., assignor to Raytheon Company, Lexington, Mass., a corporation of Delaware Filed Oct. 26, 1962, Ser. No. 233,381
4 Claims. (Cl. 315—34)

This invention relates generally to traveling wave devices, and more particularly to such a device wherein interaction between the fields of fast electromagnetic waves and electrons occurs and in which there is an energy exchange between the waves and the electrons.

Heretofore, traveling wave electron discharge devices for amplifying or generating frequency signals have included a slow wave propagating structure which effectively slows down the wave or rather produces a relatively slow wave phase velocity synchronized with the velocity of electrons permitting an exchange of energy between the wave and the electrons. The slow wave structure in such devices is designed in consideration of the operating frequency of the device, and so the dimensions of the structure are limited by the frequency of the wave. At millimeter wave frequencies the parts of the structure become minute and difficult to fabricate. In addition, such minute parts do not have capacity to carry high currents, and the device cannot produce high power.

It is one object of the present invention to provide a traveling wave electron discharge device which can be operated at millimeter wave frequencies to produce substantial power.

Heretofore, crossed-field type traveling wave electron discharge devices employing a continuous cathode and completely reentrant electron streams have been employed to produce relatively high power at high efficiency. Examples of such devices are the magnetron, amplitron and stabilotron. They generally include wave conducting anode structure surrounding the continuous cathode and defining an interaction space therebetween. Crossed D.C. electric and magnetic fields in the interaction space compel electrons issuing from the cathode to move along arcuate paths and interact with the fields of the waves. As a result of this interaction electrons form into a space charge which is phase focused so as to have the appearance of spokes which move in a circumferential direction through the interaction space. The wave energy in such devices also moves in a circumferential direction, and the phase velocity of the fringing fields of the waves which couple into the interaction space is substantially in synchronism with the circumferential velocity of the spokes. Thus, the magnitude of the phase velocity is limited by the circumferential velocity of the electrons, and the wave conducting structure must be designed with this limitation in mind. It is another object of the present invention to provide a traveling wave electron discharge device employing a continuous cathode and completely reentrant electron stream as in the above-mentioned tubes, while at the same time providing wave conducting structures adjacent the electron beam for conducting waves having phase velocities which are not limited by the velocity of electrons.

In specific embodiments of the present invention the above objectives are combined, and a structure producing relatively high power at millimeter wave frequencies is provided. These embodiments include a substantially continuous interaction space defined between a cathode and an anode, the anode including parts for conducting waves. Generally, the electron stream is continuous through the continuous interaction space, and the electrons move in a substantially circumferential direction about the axis of the device. The direction of travel of the waves, on the other hand, is preferably substantially parallel to the axis of the device and, therefore, transverse to the direction of the electron stream. The electrons are compelled to move along circumferential paths by transverse electric and magnetic fields in somewhat the same fashion as in a magnetron; however, other field orientations could be employed to achieve the same circumferential movement of the electrons. Since the direction of gain is parallel to the direction of the waves which is substantially parallel to the axis of the device, the gain is in an axial direction.

In operation, the electron space charge is somewhat like the space charge in a magnetron or amplitron insofar as it includes spokes of relatively high electron density which move endlessly through the continuous interaction space. In the present invention the spokes are defined by three dimensions rather than two dimensions as in a magnetron, and the spoke shape of the space charge is retained throughout the axial length of the interaction space. Furthermore, the tip of each spoke defines a line which is slightly tilted with respect to the direction of wave propagation, and so the space charge has the appearance of a fluted column twisted along its axis. As a result, the axial velocity of the crossover point of the tip of each spoke and any given wave conducting path is determined by the angle of this tilt and the circumferential velocity of the electron stream. The axial velocity of this crossover point is preferably equal to the phase velocity of the waves, and will, theoretically, go to infinity as the tilt angle is reduced to zero. Accordingly, the necessity of reducing the wave phase velocity to permit the electrons to keep up with it as in the magnetron and other traveling wave devices is substantially avoided.

Another embodiment of the invention includes a plurality of wave conducting paths defined by anode vanes arranged parallel to each other and lying in different planes, all of said planes being parallel. Two banks of such vanes are arranged one upon the other, and the cathode preferably surrounds both banks of vanes defining a continuous space therebetween which has the appearance of a flattened cylinder and through which electrons move along substantially straight paths where they interact with the fields of waves conducted through the spaces between the one bank of vanes and then proceed to follow sharply arcuate paths and move in an opposite direction along straight paths past the other bank of vanes. Accordingly, the electron motion is rectilinear along sections of the space where the interaction takes place and is sharply arcuate along sections of the space where there is substantially little or no interaction. This structure is particularly adaptable for stacking, whereby a plurality of groups of wave conducting anodes and their associated cathodes and interaction spaces are stacked one upon another to afford higher power operation. One principal feature of this embodiment is that a wave front polarized in a given direction will energize all of the wave conducting spaces at the same instant and in the same phase, and so a space wave and particularly a polarized space wave may be launched into the device energizing all of the wave conducting paths. This feature can be combined with the stacking feature to produce an ultrahigh power amplifier energized by a space wave, thus eliminating the requirement of a wave conducting structure or structures at the input of the device.

Other features and objects of the invention will be apparent from the following specific description of embodiments of the invention taken in conjunction with the figures in which:

FIGS. 1*a* and 1*b* illustrate a plan-sectional view taken through the axis of a traveling wave amplifier incorporating features of the invention;

FIG. 1*c* is an exploded view of part of FIG. 1*a* showing details of a cathode structure;

FIG. 2 includes two sectional views of the traveling wave amplifier taken perpendicular to the axis;

Figures 8, 9:
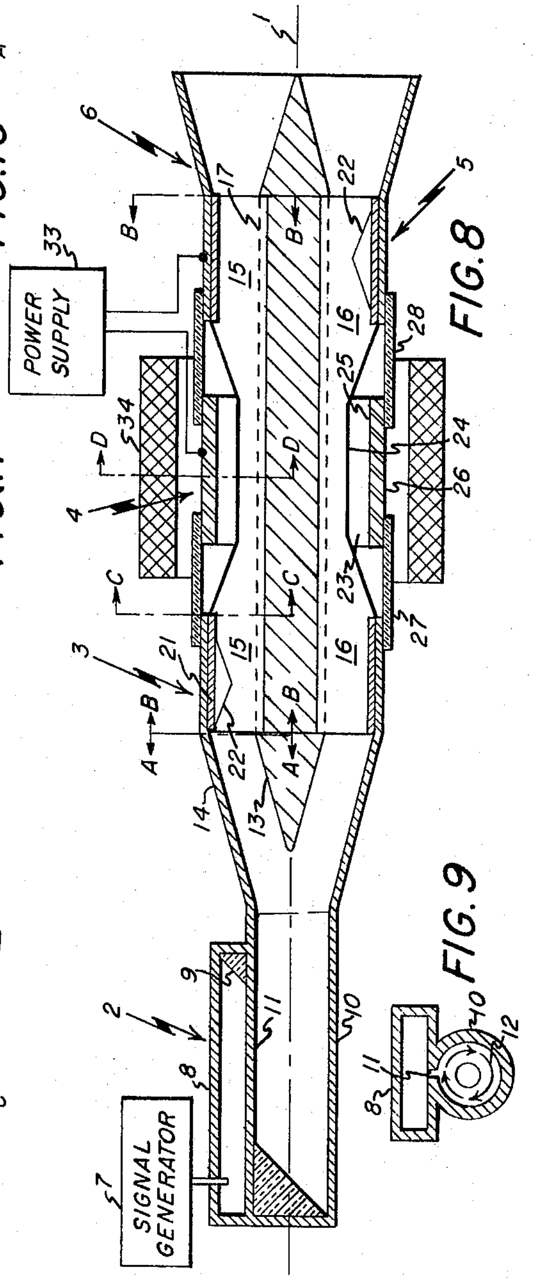

Turning first to FIG. 8 there is shown a longitudinal sectional view of a symbolic representation of a traveling wave amplifier incorporating features of the invention. The sectional view in FIG. 8 is taken through the axis 1 and includes a generator section 2, a phase shift section 3, an amplifying section 4, another phase shift section 5 and a radiating section 6 all of which are principally figures of revolution about the axis 1. Electromagnetic waves of the proper mode are generated in the generator section 2 by, for example, coupling a signal generator 7 which may be a klystron to one end of rectangular waveguide 8 which includes an absorbing load 9 at its other end. The rectangular waveguide couples to a circular waveguide 10 by means of a plurality of openings 11 in the walls of the two guides which are in registry with each other and at predetermined spacings along each. Waves are conducted in the rectangular guide in a fundamental TE mode, and so the mode of propagation in the circular guide 10 will also be in a TE mode for which the electric fields may be illustrated by the curved vectors 12 shown in FIG. 9.

Figures 10, 11, 12:
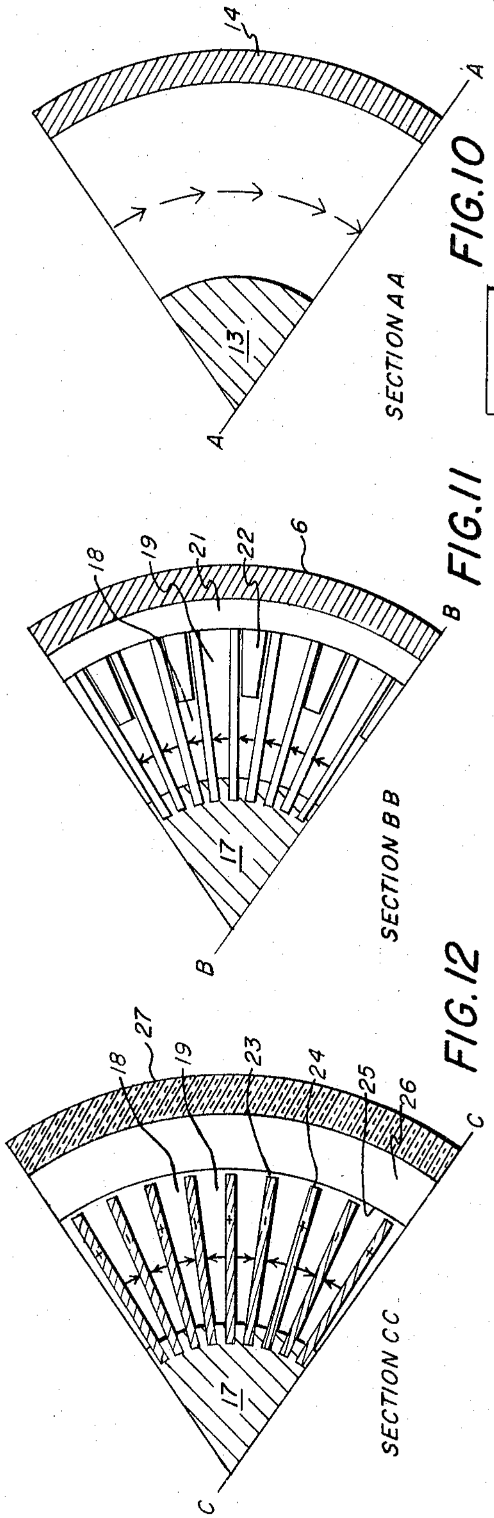
FIGS. 8–13 are sectional views of a symbolic representation of the invention which is representative of the device in FIGS. 1*a*, 1*b* and 2 and serves to illustrate principles of operation of the invention.

The waves conducted by the circular waveguide 10 continue in the same TE mode along through a coaxial transition section including conical center and outer conductors 13 and 14 shown in enlarged section in FIG. 10 and are launched into spaces between a multitude of radially disposed vanes such as 15 and 16. These vanes are attached to a conductive center body 17 and are preferably equally spaced projecting from the center body along its entire length, and defining wave passages through the phase shift sections 3 and 5 and the interaction section 4.

Phase shift section 3 includes the spaced vanes defining a plurality of wave paths such as 18 and 19 shown in the enlarged sectional view in FIG. 11 and a section of cylinder 21 attached to the ends of the vanes and including a plurality of triangle-shaped plates such as 22, there being precisely half as many such plates as there are spaces between the vanes. Each plate projects into the space between a pair of vanes in such a manner that one group of alternate spaces including, for example, space 18 between the vanes is loaded with plates such as 22, whereas the other group including space 19 is not. In other words, the plates 22 project into, for example, only the even numbered spaces between vanes. The purpose of the plates 22 is to restrict the wide dimension of the wave conducting paths defined by alternate spaces between vanes so that waves conducted through these spaces are shifted in phase relative to waves connected along the adjacent spaces. More particularly, 180° differential phase shift is preferred so that at section CC the waves conducted in adjacent spaces between the vanes are 180° out of phase. The electric fields of the waves in the spaces at section BB are represented by the arrows in FIG. 11, and it can be seen that by the orientation of these arrows waves in adjacent spaces are in like phase. On the other hand, at section CC after a phase shift has been imposed upon waves in alternate spaces, the phase of waves in the spaces are as illustrated by the arrows in FIG. 12. The purpose for this phase shift will become apparent from description directed to FIGS. 10–13.

Beyond phase shift section 3 the ends of the vanes are open so that waves conducted along each space between vanes fringe into the interaction space 23. The interaction space is defined as the space between the ends 24 of the vanes and the inside surface 20 of cylindrical cathode 26. The cathode 26 is mounted to and insulated from the anode structure which includes the vanes 15 and 16, center body 17, waveguides 8 and 10 and phase shift sections 3 and 5. Accordingly, the cathode 26 is insulated from all these parts by, for example, ceramic cylinders 27 and 28 which attach to opposite ends of the cathode, and serve to electrically insulate the cathode from the anode.

Figure 13:
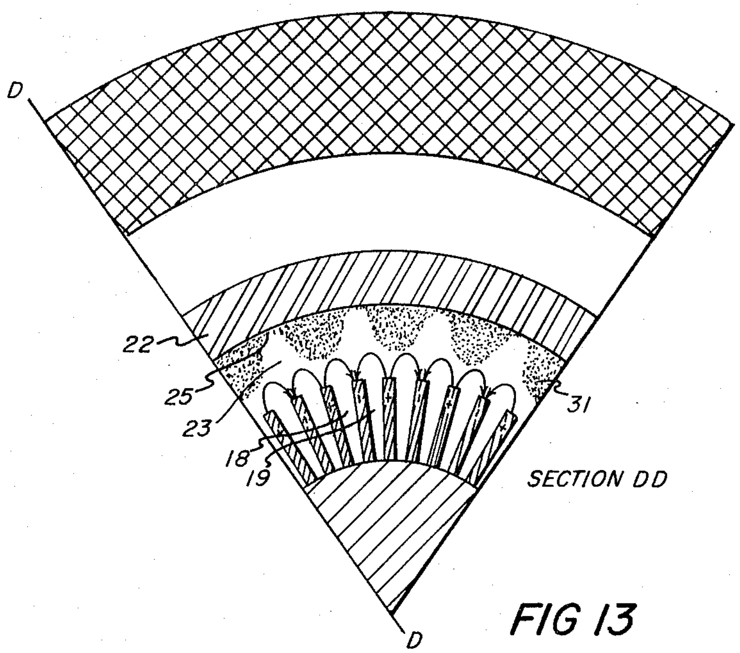
Figure 14:
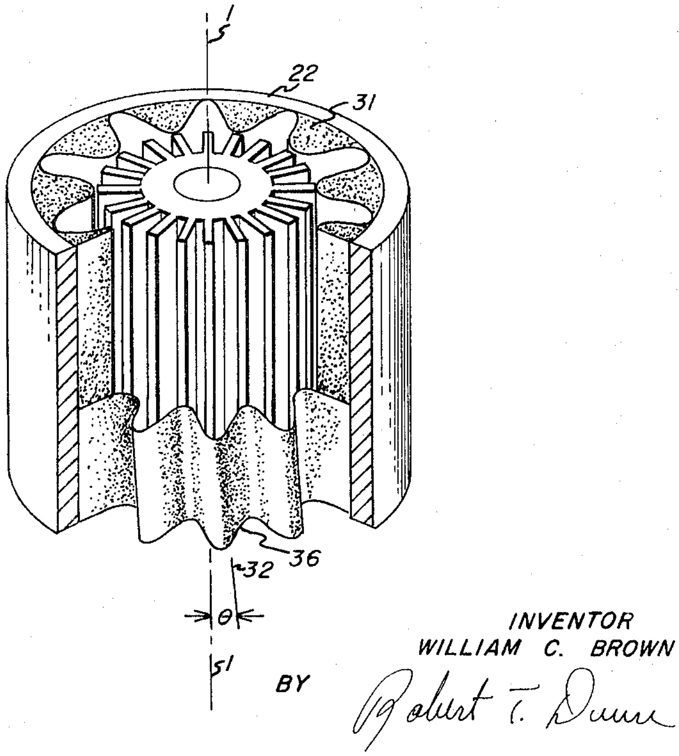
FIG. 14 is a break-away view of the device showing the anode, cathode and electron space charge to illustrate principles of the invention.

Amplification of the waves takes place as the waves are conducted alongside the interaction space 23. Each pair of vanes in conjunction with the center body 17 defines a wave conducting path. Along the interaction space 23 the ends of the vanes are not closed, and so the fields of the waves fringe out beyond the ends of the vanes into the interaction space somewhat as illustrated in FIG. 13 which shows a section taken at DD. In FIG. 13 the fringing fields of the waves conducted in two adjacent spaces are represented by the curved vectors which run between the ends of the vanes. Since waves in adjacent spaces such as 18 and 19 are in opposite phase, the instantaneous polarity of adjacent vanes are opposite, and, for this reason, the vanes are designated plus or minus. One effect of the fringing fields is to phase focus the electron space charge 31 somewhat as shown in FIG. 13. The phase focusing causes the space charge to have the general shape of an inside gear with teeth that project from the cathode surface 25 inwardly toward the vanes, the separation between teeth being the same as the separation between alternate vanes. A three-quarter break-away view of the interaction space showing the shape of the space charge in three-dimension is illustrated in FIG. 14. In three dimensions the space charge has the appearance of a long twisted inside gear. It is twisted slightly from one end to the other about the axis 1 of the device so that the ridge or edge of one of the teeth defines a line such as line 32 which forms an angle $\theta$ with the edge of the immediately adjacent vane.

In operation, a power supply such as 33 provides a D.C. potential between the anode vanes and the cathode producing a radial electric field in the interaction space, while at the same time a solenoid type magnet 34 provides a magnetic field in the interaction space which is substantially transverse to the radial electric field and is parallel to the axis 1. These crossed electric and magnetic fields compel the electron space charge 31 to move around the axis 1. The angle $\theta$ is determined by the tangential velocity of motion of the space charge as it revolves around the axis 1 and the phase velocity of waves which are conducted in the spaces between vanes in a direction substantially parallel to the axis 1. More particularly, tan $\theta$ is substantially equal to the ratio of these two velocities which will be referred to herein as the space charge tangential velocity and the wave phase velocity. Efficient interaction between the fringing fields of the waves and the electron space charge generally requires that the space charge have a phase velocity equal to the phase velocity of the wave and in the same direction. Since the phase velocity of the wave is generally greater than the free space velocity of the wave, the phase velocity of the space charge must be many times the tangential velocity of the space charge. In the present invention this is accomplished by the phase focusing action of the fringing fields of the waves upon the space charge of electrons moving abut the axis 1. The effect is to give the space charge the shape of a long inside twisted gear so that the edge of any particular tooth of the gear such as tooth 36 in FIG. 14 is tilted slightly at the angle $\theta$ relative to the edge of the adjacent vane. The phase velocity of the space charge parallel to the axis 1 is the velocity of the crossover point of line 32 which defines the edge of tooth 36 with the edge of the adjacent vane. As the angle $\theta$ goes to zero, the axial velocity of this crossover point goes to infinity. Thus, it is seen that the electrons move in a plane substantially orthogonal to the wave conducting paths with little or no axial or longitudinal and essentially all radial and circumferential components of motion.

The length of the interaction space 23 is designed so that there is a net flow of energy from the electron space charge to the waves. In other words, the amplitude of the fringing fields of the waves increases along the interaction space, and the waves are thus amplified. There is, to be sure, a slight flow of energy from the waves to the space charge in the course of focusing the space charge, but there is greater energy flow in the opposite direction, and the source of this energy is the power supply 33. The amplified waves are then conducted through phase shift section 5 which is substantially the same as phase shift section 3 except that the triangular plates such as 22 are loaded into different spaces between the vanes. For example, in phase shift section 3, the triangular plates such as 22 are inserted into the even numbered spaces between vanes such as space 18, whereas in phase shift section 5 they are inserted into the odd numbered spaces between vanes such as space 19 so that only waves conducted along the odd numbered spaces are shifted in phase. The amount of the phase shift is preferably the same as in phase shift section 3 with the result that waves in adjacent spaces are brought into like phase, and the cross section illustrating operation at the output of phase shift section 5 appears substantially the same as a cross section at the input of phase shift section 3, the major difference being that the waves are of considerably greater amplitude at the output of section 5. A coaxial radiating horn 6 is provided to direct radiation from the ends of the spaces for any of a great number of useful purposes.

Figures 1A, 1C:
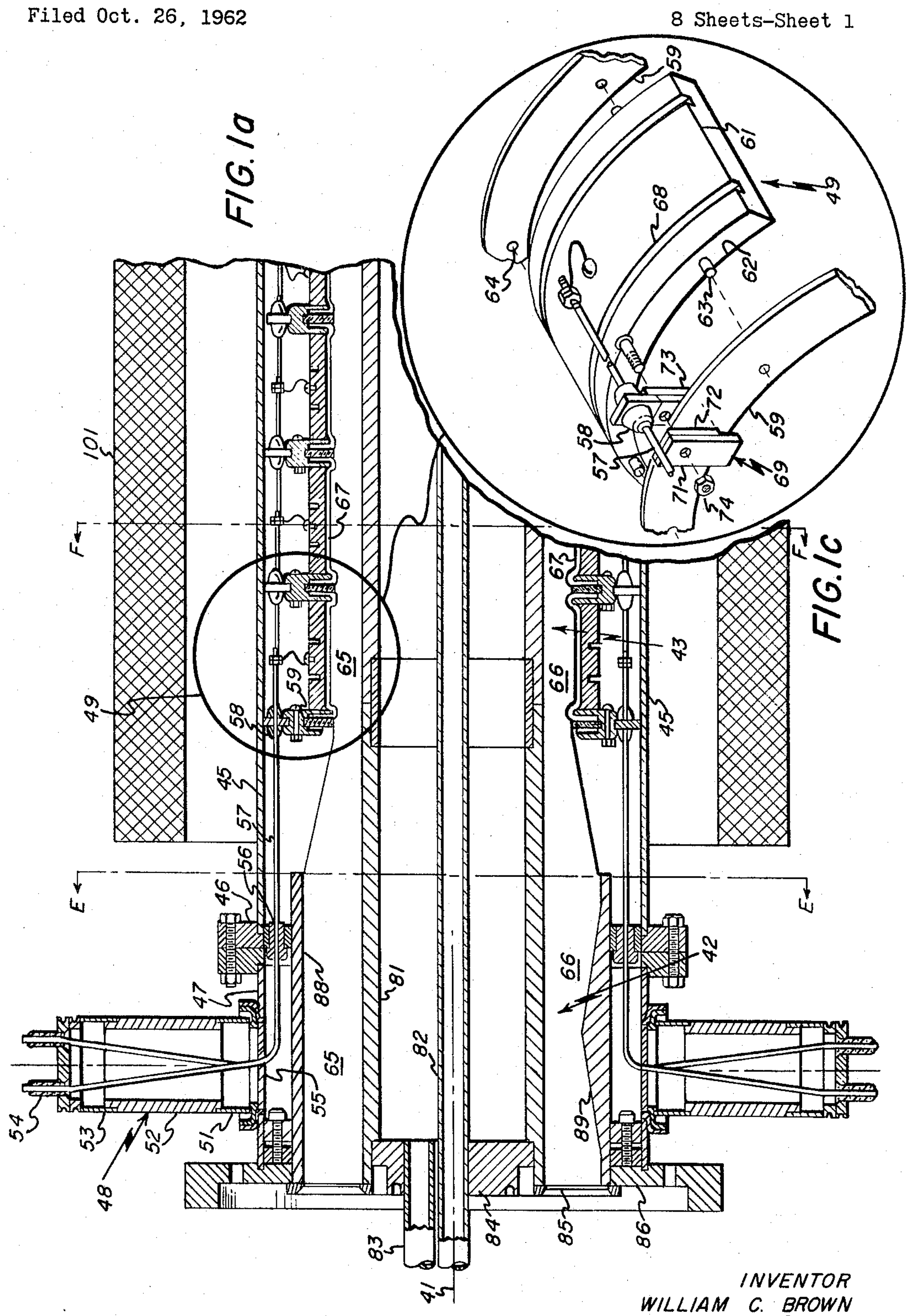
Figure 1B:
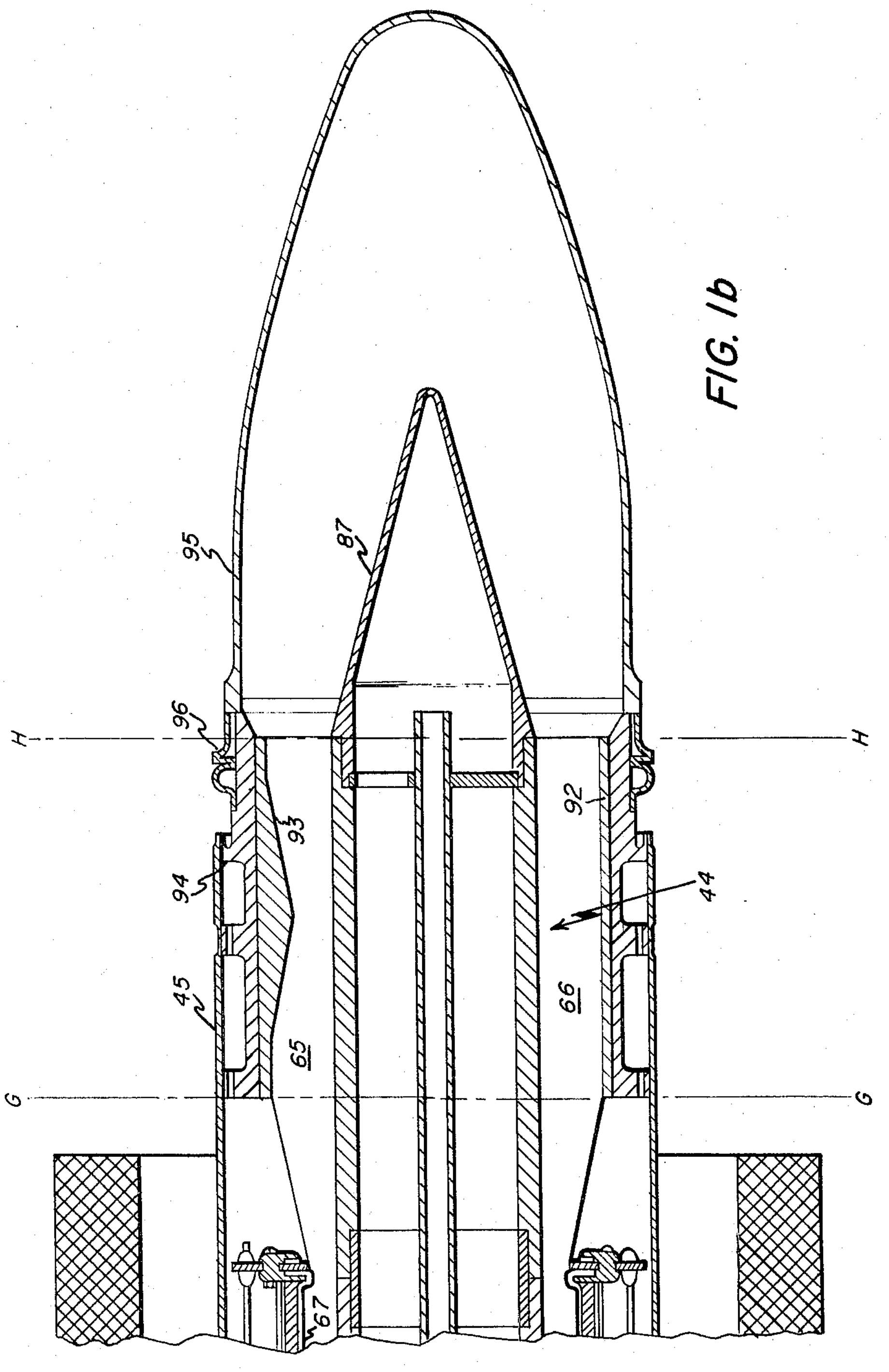
Figure 2:
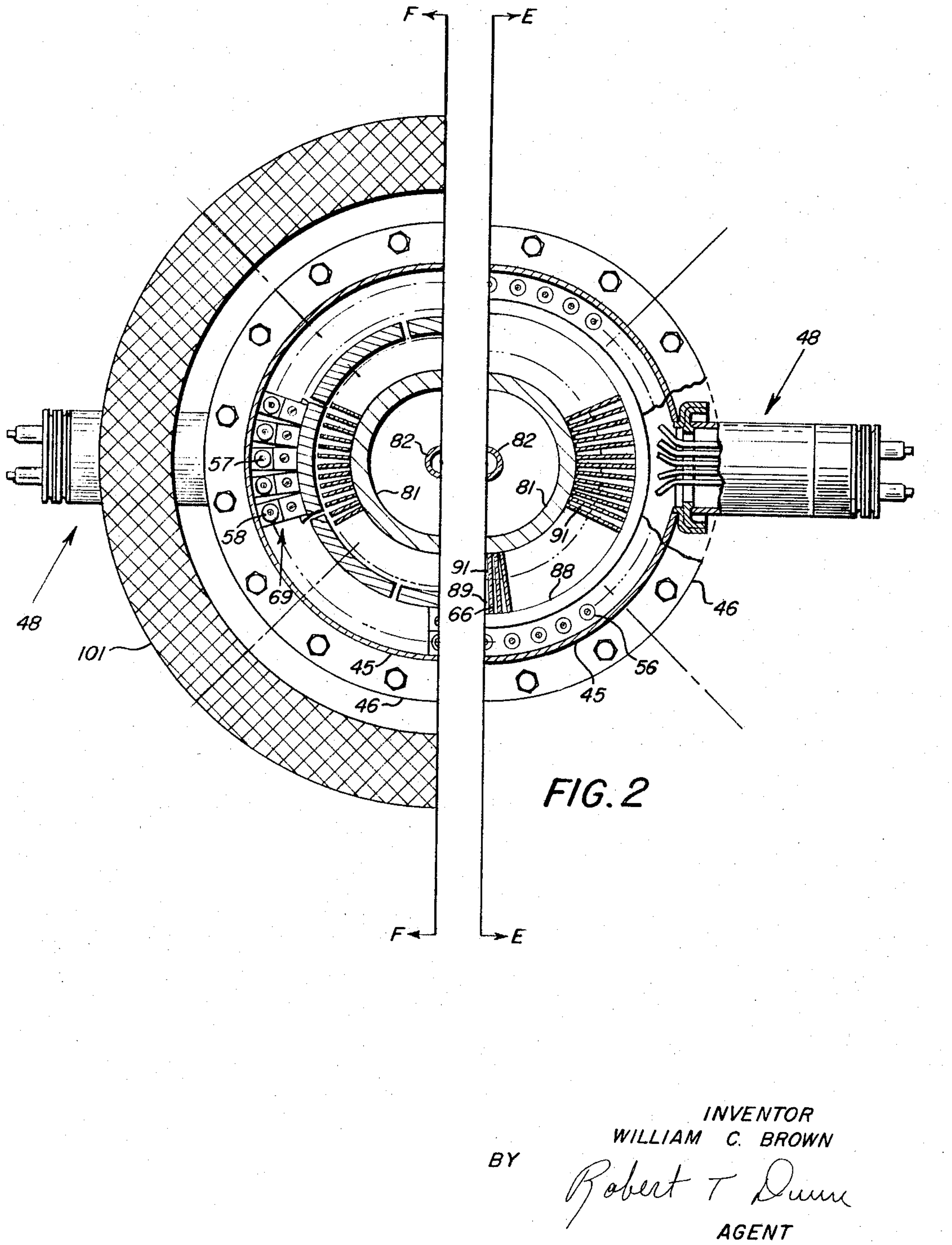

Turning next to FIGS. 1*a*, 1*b*, 1*c* and 2, there are shown details of an embodiment of the invention which is similar in many respects to the embodiment illustrated in FIGS. 8–14 described above. FIGS. 1*a* and 1*b* are longitudinal section views of the device; FIG. 1*c* is an enlarged exploded view to show cathode detail; and FIG. 2 illustrates sectional views taken at sections EE and FF which are transverse to the axis 41. The tube includes 3 sections, phase shift section 42, interaction section 43 and phase shift section 44, all of which are generally figures of revolution about the axis 41 except for certain parts which will be apparent from the following description. The interaction section and phase shift section 44 are enclosed by conductive cylinder 45 which forms the envelope about these sections and is attached by a flange 46 to a short section of envelope 47 which encloses the phase shift section 42. Cylindrical envelope 47 is equipped with a plurality of separate cathode lead terminals such as 48, each including five cathode voltage leads for five separate cathode sections such as cathode section 49. The terminals 48 include a metallic flange 51 attached to a ceramic cylinder 52 which in turn attaches to another metallic flange 53 supporting the individual lead terminals 54 which carry the leads to the cathodes in such a manner that the leads are insulated from each other and other surrounding structures. Part of this insulation is provided by a ceramic disc 55 which attaches at the base of flange 51 to an opening in the wall of the cylindrical envelope 47 and ceramic plugs such as 56 which are secured to openings in the flange 46.

The cathode leads such as lead 57 extend in through the terminal 48 through the envelope wall and from there extend longitudinally parallel to axis 41 through insulating plugs such as plug 58 which are clamped to one of the ceramic support rings 59 which support the individual cathode structures such as structure 49. Each of the separate cathode structures 49 includes an arcuate plate 61 which is coated on its inside with a layer 62 of suitable cold electron emissive material such as platinum and is disposed concentric with the axis 41, each plate subtending substantially the same angle projecting from the axis 41. An exploded three-quarter view of cathode 49 is shown in FIG. 1*c*. Each of the plates is supported by four quartz pins such as pin 63 which slidably insert into the plate as shown and into openings 64 in the ceramic support rings 59. The ceramic rings 59 are attached at their inner periphery to the anode vanes such as vanes 65 and 66, and thus the cathode plates 61 are supported from the vanes. This construction rigidly fixes the radial dimensions of the interaction space 67 which is the annular space between the ends of the vanes and the surface of the platinum layer 62 on the inside surface of the cathode plates.

Grooves 68 are cut in the outer surface of the arcuate plates and extend transversely to the axis of the pins 63. The depth of each groove is limited only by the disposition of the pins within the wall structure of the plates 61. Expansion and contraction of the plates will be compensated for by the described grooves and assure continued engagement of the pins 63 within the openings 64 of the rings 59 throughout operation of the device.

The cathode lead such as 57 is carried by insulator 58 held in position by a clamp 69 comprised of members 71, 72 and 73 held by a nut and screw 74 securely fastening the insulator 58 to the ring 59. Thus the cathode 49 and cathode lead 57 are both supported by the insulating rings 59 which attach directly to the anode vanes such as 65 and 66.

The anode structure includes a metallic support cylinder 81 concentric with the axis 41 enclosing cooling fluid passage defined by the annular space between cylinder 81 and another smaller cylinder or tube 82 into which fluid is forced from a line which attaches to tube 82. In operation it is preferable that fluid be introduced through a second tube 83 to the annular space between cylinder 81 and tube 82, and that the fluid flow the length of the annular space and return through tube 82 to a fluid sump. A metallic boss 84 is provided for closing the end of cylinder 81 and for carrying the tubes 82 and 83. The outer periphery of the boss 84 seals to the inner diameter of ring-shaped wave transparent window 85, while the outer diameter of the ring seals to flange 86 which is attached to one end of envelope cylinder 47. The other end of cylinder 81 is closed by a conical-shaped metallic cover 87.

The waveguide portion of the anode structure includes a plurality of vanes such as vane 65 and vane 66 which extend radially from the cylinder 81 and which define wave conducting spaces. In the phase shift section 42 these wave conducting spaces are enclosed as a waveguide, the enclosure at the ends of the vanes being made by a cylinder 88 which extends the length of the phase shift section 42 and supports triangular-shaped metallic plates such as 89 which project into alternate of the spaces betwen the vanes. Assume for purposes of explanation that the plates 89 project into the even numbered spaces between the vanes such as space 91 shown in FIG. 2 and the space toward the reader immediately adjacent vane 66 shown in FIG. 1*a*. The other spaces will be denoted even numbered spaces.

Phase shift section 44 is similar in construction to the phase shift section 42 and includes a metallic cylinder 92 enclosing the ends of the vanes and supporting triangle-shaped metallic plates 93 which project into the odd numbered spaces between vanes such as the space immediately adjacent vane 65 toward the reader in FIG. 1*b*. Phase shift section 44 is attached to the inner wall of cylinder envelope 45 by a substantially cylindrical support structure 94 which provides electrical connection therebetween and provides a rigid support between the anode and envelope. A wave transparent window 95 attaches to one end of the support 94 and is securely fastened thereto by retaining spring 96.

In operation waves are launched through the window 85 from a waveguide structure which attaches to the flange 86 and which is very similar to that illustrated symbolically in FIGS. 8 and 9. This waveguide structure preferably conducts electromagnetic waves from a generator to a short section of coaxial line which attaches to the flange 86 and which conducts the waves in a $TE_{01}$ mode or in any other mode which will launch waves into the spaces between the vanes so that waves in adjacent spaces are substantially in phase. The triangle plates 89 are designed so that the wave passages into which they are inserted will cause a half wave length delay relative to the delay in the immediately adjacent space which does not include such a triangular plate. As a result, waves in adjacent spaces between the vanes at section EE in FIG. 1*a* will be in substantially opposite phase as illustrated in FIG. 12 and described above with relation to the symbolic representation of the structure. Between aforementioned section EE and GG in FIG. 1*b* the ends of the vanes are open so that the fields of the waves in spaces between the vanes fringe outward from the ends thereof. The fringing fields project into the interaction region 67 and exchange energy with electrons issuing from the electron emisive surfaces of the cathodes such as platinum surface 62. The space between the ends of the vanes and the cathode surfaces which defines the interaction region is preferably on the order of a half wave length or less and is preferably precisely fixed throughout the length of the interaction region. The rigid radial attachment of the cathodes 49 to the ends of the vanes serves to maintain this alignment and uniformity of the radial dimensions of the interaction region.

The electron space charge in the interaction region is phase focused in the manner already described above with relation to FIG. 14, and this space charge is caused to revolve around the axis 41 by transverse magnetic and electric fields in the interaction region. The transverse electric field is generally radial and is bounded by the ends of the vanes which are at anode potential and by the electron emissive surfaces of the cathode such as 62 which are at individually adjustable cathode potentials available through the separate terminals such as terminal 54, each of which connects to separate power supplies not shown. The magnetic field is produced in the interaction space by a permanent or solenoid magnet such as magnet 101 which generates a magnetic field substantially longitudinal to the axis 41 in the interaction region 67.

In the course of interaction the electrons are phase focused and there is a degree of energy flow from the waves conducted in the space between vanes to the electron space charge. This focusing described above with reference to FIGS. 13 and 14 is such that the space charge has a phase velocity parallel to the direction of propagation of the waves which is substantially equal to the phase velocity of the waves. The length of the interaction space is so designed that there is a net energy flow from the space charge to the waves, and the waves are thus amplified. Accordingly, at section GG the waves are considerably amplified as compared with the amplitude of waves at section EE; the phase relationship between waves in adjacent spaces, however, at section GG is the same as the section EE. Phase shift section 44 is provided to shift phase of waves in, for example, the odd numbered spaces so that waves will all be in the same phase at section HH and will be launched from section HH through the window 95 toward a utilization device of some sort. For example, they may be launched toward a target to illuminate the target or to carry a signal or energy to the target.

The general principles of operation in the interaction space 67 whereby the space charge is phase focused and whereby there is an exchange of energy from the space charge to the waves is offered herein merely to explain the process of amplification. The explanation, however, is not a rigid one, and other theories of operation could be substituted which would perhaps be satisfactory to explain the phenomenon. The specific embodiment described herein includes two phase shift sections 42 and 44 which are constructed to shift phase of waves in alternate spaces between vanes by 180° or half a cycle relative to the waves in spaces therebetween, and, as a result, the space charge is phase focused to include spokes separated from each other by the distance between the ends of alternate vanes as already described above with reference to FIG. 13. The present invention is not to be restricted to half cycle phase shifts and to the specific type of phase focusing illustrated in FIG. 13. For example, it is quite possible to shift phase of waves in adjacent spaces between vanes by amounts greater or less than half a cycle so that the space between the spokes in FIG. 13 will be greater or less than the distance between the ends of alternate vanes without deviating from the spirit or scope of the invention. The embodiments described herein employ half cycle phase shifts because these result in the simplest phase shift structures and require only that half of the wave conducting spaces be loaded to produce a predetermined phase shift.

Figure 3:
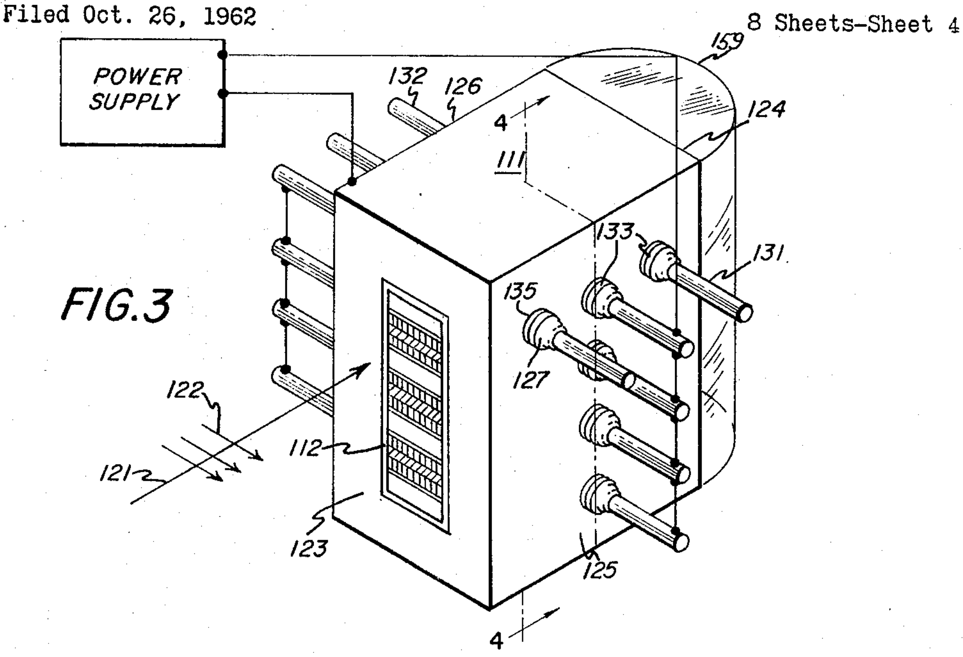
FIG. 3 is a three-quarter view of a stacked arrangement of traveling wave amplifiers incorporating features of the invention.

Turning next to FIGS. 3–6 there is illustrated another embodiment of the invention including a plurality of anodes and cathodes each forming a separate interaction region one stacked upon another, the orientation of wave conducting spaces in the anode being such that a plane polarized space wave, can be launched simultaneously into all the wave conducting spaces so that all spaces will conduct waves in the same phase. The composite structure is illustrated in FIG. 3 which includes a substantially rectangular-shaped envelope 111 including rectangular window 112 at one end through which a space wave or a plane polarized wave from a waveguide is launched into the spaces between the anode vanes. In the embodiment illustrated in FIG. 3 three separate structures are included, one stacked upon another, each structure including an anode assembly such as 113 illustrated in FIG. 6 which is preferably electrically attached and supported at its ends by the envelope 111 and a cathode assembly such as 114 also supported by the envelope 111 but electrically insulated therefrom. Each of the anode assemblies includes a pair of half cylinders 115 and 116 arranged parallel to the axis of the device and attached longitudinally by a plate 117 which also supports the upper and lower banks of vanes 118 and 119. These vanes define wave conducting passages which conduct waves along paths parallel to the axis of the device and are arranged so that waves may be launched into each of the passages from a single wave front, and the waves thus launched will all be of the same amplitude and phase. It is preferable that the wave front be launched through the window 112 in a direction perpendicular thereto as indicated by the arrow 121 and that the wave be plane polarized as indicated by the arrows 122. This is preferable, even though circularly or elliptically polarized waves could be launched into the spaces between the vanes, and such waves would be of equal amplitude and phase in all the vanes and result in satisfactory operation for some purposes. However, the broadest and most extensive use of the device would require plane polarized waves, the direction of polarization being transverse to the orientation of the banks of vanes 118 and 119.

Figure 4:
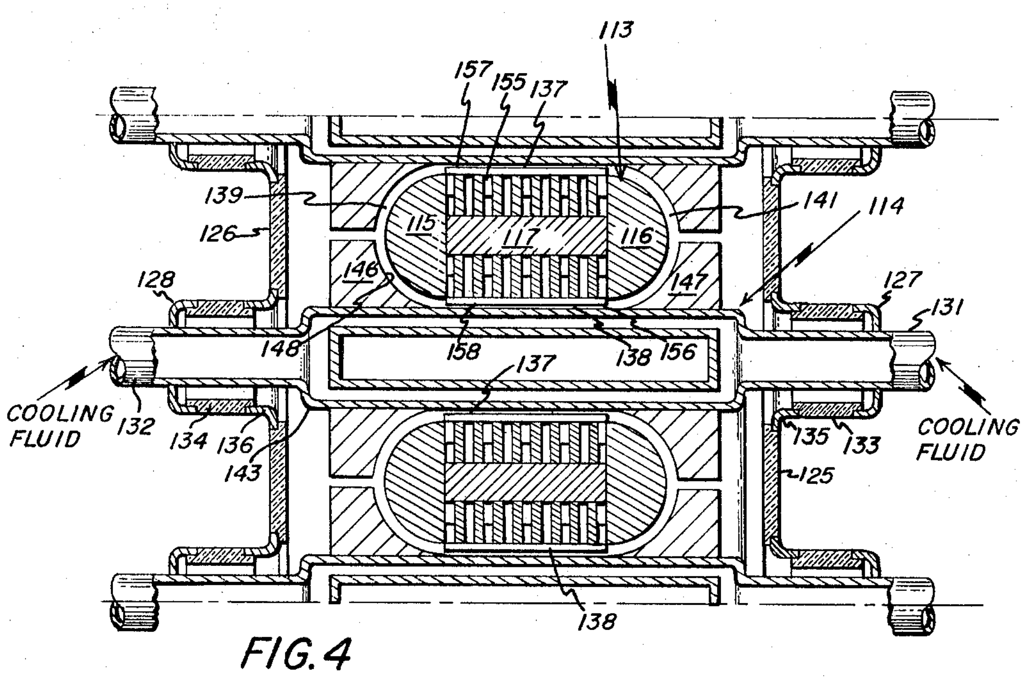
FIG. 4 is a sectional view of the device in FIG. 3 showing the arrangement of some of the stacked traveling wave amplifiers.

A sectional view of the assembly shown in FIG. 3 is illustrated in FIG. 4 which shows two of the complete anode cathode assemblies, one stacked upon the other with passages in between for conducting cooling fluids. The anode assemblies such as 113 are supported at their ends by attachment to the input and output faces 123 and 124 of the envelope 111. The cathode assemblies 114, on the other hand, are supported but electrically insulated from the sides 125 and 126 of the envelope 111. Each cathode assembly 114 is supported by a plurality of, for example, Kovar rings such as 127 and 128 which are attached to the fluid conducting tubes such as 131 and 132, and also attached to ceramic rings such as 133 and 134. These ceramic rings are attached to openings in the walls 125 and 126 of envelope 111 by second Kovar rings 135 and 136. Thus, the cathode assemblies are supported by the walls 125 and 126 of the envelope by rigid mechanical attachment thereto but are electrically insulated from said walls by ceramic rings.

The complete assembly of anode and cathode assemblies by mounting within the envelope 111 is one requiring careful and precise alignment because the upper and lower interaction regions such as 137 and 138 therebetween through which the electron space charge moves must be accurately maintained in order to insure a predetermined electron velocity in response to predetermined magnitudes of the anode to cathode voltage and magnetic field strength in the interaction regions. The magnetic field is provided by permanent or electromagnets not shown but which produce a substantially uniform magnetic field parallel to the propagation of the waves throughout the interaction regions 137 and 138 and electron circumferential regions 139 and 141.

Figures 5, 6:
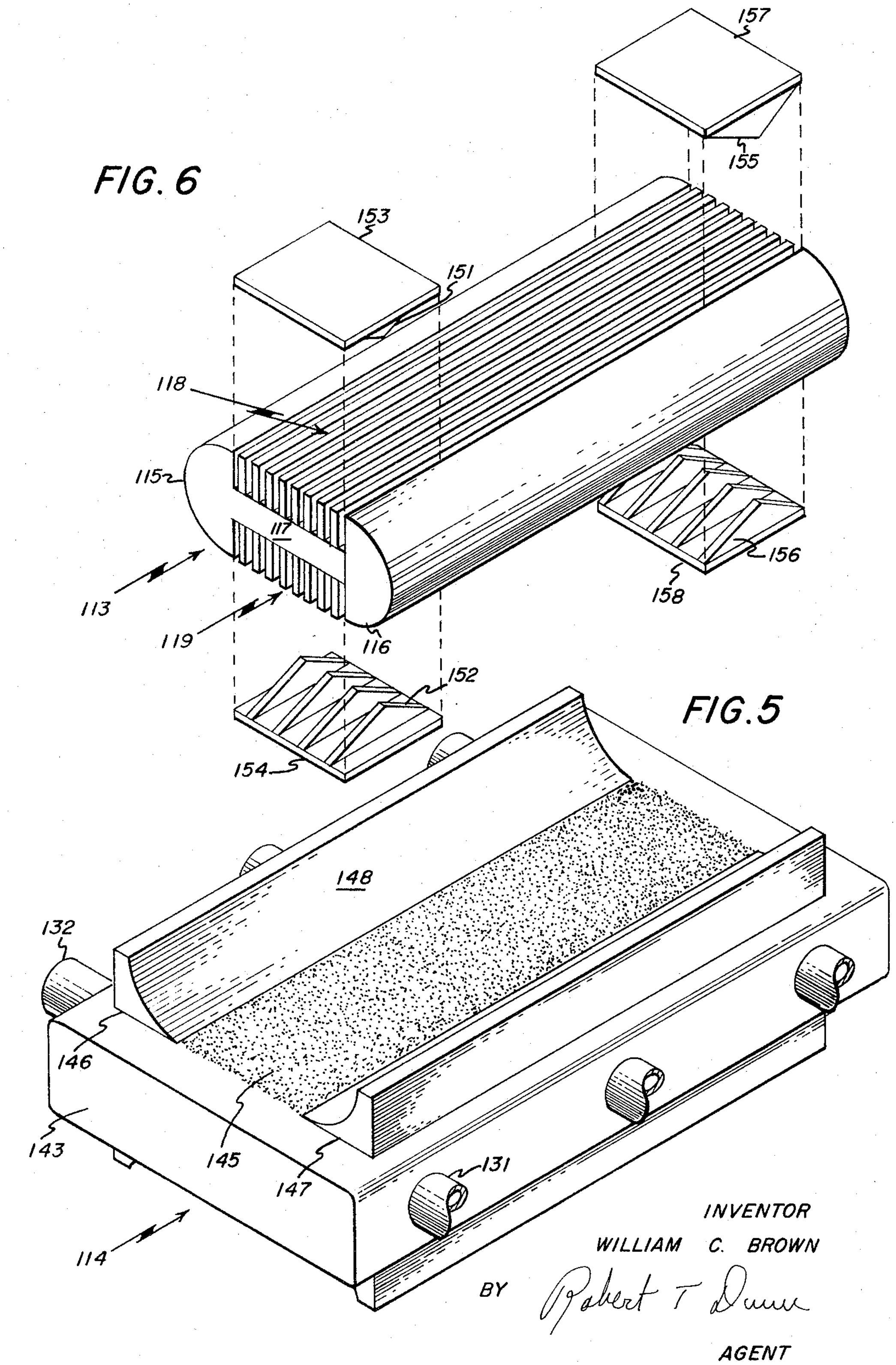
FIG. 5 illustrates a typical one of the cathode structures which are stacked between anode structures in the device of FIG. 3.
FIG. 6 illustrates a typical one of the anode structures stacked between cathode structures to form the device in FIG. 3.

Cooling fluid passages are included in each cathode assembly such as assembly 114 in FIG. 5. Cathode assembly 114 includes a sealed cooling jacket 143 with a plurality of fluid conducting tubes such as 131 and 132 extending from each side as shown in the figure. A strip of electron emitting material 145 is included on each side of the jacket 143 between a pair of electron shields such as 146 and 147; one surface of each of these shields such as surface 148 is contoured to match the outer contour of the anode cylinders 115 and 116 and defines an electron circumferential path such as 139 therebetween.

Phase shift sections are provided at each end of the anode 113 for shifting phase of waves in alternate spaces between vanes by $\lambda/2$ relative to waves in spaces therebetween and perform the same function as phase shift sections 42 and 44 described above with reference to FIGS. 1*a* and 1*b*. These phase shift sections are formed by triangular plates inserted into alternate spaces at the ends thereof as shown in FIG. 6. The triangular plates such as 151 and 152 are inserted into even numbered spaces of upper and lower banks of vanes 118 and 119 and are attached to conductive plates 153 and 154, respectively, thus forming phase shift sections at the input end of the anode 113. Similar phase shift sections are provided at the output end of the anode by triangular plates 155 and 156 inserted into odd numbered spaces of the upper and lower banks of vanes 118 and 119. The triangular plates 155 and 156 are attached to conductive plates 157 and 158 as shown.

The assembly, shown in FIG. 4 includes the anode assemblies 113 sandwiched between a pair of cathode assemblies 114 to form two interaction spaces, an upper interaction space 137 and a lower interaction space 138 adjacent the upper and lower banks of vanes 118 and 119, respectively. The electron space charge formed of electrons emitted from the emissive surface such as 145 is compelled to move through the interaction spaces transverse to the direction of propagation of waves which are conducted in the spaces between the vanes. This motion is caused by transverse electric and magnetic fields produced in the interaction spaces and in the electron return spaces between the cathode shield surfaces 148 and the anode cylinders 115 and 116. As a result, the electron space charge moves transverse to the banks of vanes, and, therefore, transverse to the path of waves conducted between the vanes and proceeds from substantially rectilinear paths through the interaction space to arcuate paths in the space between anode cylinders and cathode shields. Thus, the space charge moves continually through the upper and lower interaction spaces 137 and 138 adjacent each of the anode assemblies.

In operation, as already mentioned, the waves are launched into the upper and lower banks of paths in like phase just as in the embodiments of the invention described in FIGS. 1*a*, 1*b*, 2 and 8–13. Alternate spaces between vanes, however, are suitably designed at each end of the anode assembly to cause a half cycle phase shift of the waves conducted therein, and this phase shift is accomplished in the phase shift sections described above which at one end shift phase of waves conducted in, for example, the even numbered paths and at the other end shift phase of waves conducted along odd numbered paths. Thus, waves in adjacent paths upon entering the interaction space are in opposite phase and tend to phase focus the electron space charge substantially as already described above with reference to FIGS. 13 and 14, and the focused space charge in turn amplifies the waves. The second wave shifting section at the other end of the anode is very similar and includes bodies of conductive material loaded into alternate spaces between vanes. However, the loading here is between odd numbered spaces, and so the effect is to bring amplified waves in adjacent spaces into like phase so that linearly polarized waves are launched from the device through a window 159 toward a utilization device or target.

Figure 7:
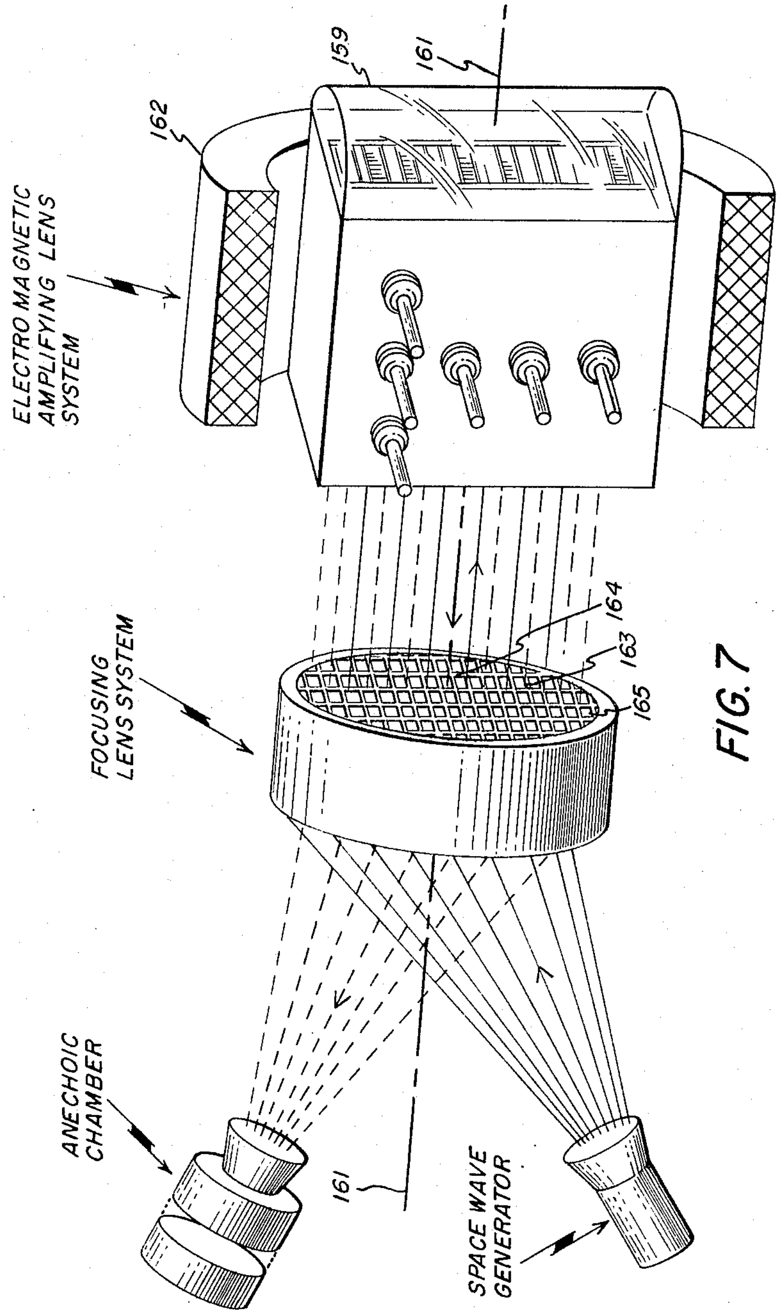
FIG. 7 illustrates one utilization of the stacked device illustrated in FIGS. 3–6.

One use of the device described above and in FIGS. 3–6 is illustrated in FIG. 7. The structure and magnet is referred to in FIG. 7 as an electromagnetic amplifying lens system disposed along an axis 161 concentric with a solenoid magnet 162. Power is launched into the amplifying lens system from a focusing lens system which is illuminated by a space wave generator. Reflections from the amplifying lens are focused by the focusing lens into an energy absorbing chamber denoted herein as an anechoic chamber wherein this reflected energy may be dissipated in a fluid medium or another sort of dissipative material, or it may be converted to another form of electrical energy such as D.C. electrical energy.

The space wave generator preferably includes a source of high frequency energy and means for radiating this energy as a substantially linearly polarized space wave into the focusing lens system. The focusing lens system preferebaly includes banks of individual nonreciprocal phase shifters such as 163 each individually controlled or at least designed for shifting phase of waves predetermined amounts. More particularly, the phase shifters 164 located close to the axis 161 shift phase a greater amount than the phase shifters 165 located along the inside perimeter of the focusing lens system. These phase shifters might, for example, each include a rectangular waveguide oriented to couple with the space wave launched from the generator, loaded with ferrite material and enclosed by a magnet for magnetizing the material, thus causing a nonreciprocal shift of phase of waves conducted by each of the rectangular guides. The degree of magnetization of each phase shifter is preferably controlled so that a substantially planar wave front is launched from the focusing lens system toward the amplifying lens system, the plane of this wave front being transverse to the axis 161 and energizing the amplifying lens which in turn launches amplified waves at its other end through window 159 toward a utilization device.

Reflections from the amplifying lens system generally form a planar wave front traveling back toward the focusing lens system. Since the individual phase shift elements 163 which form the focusing lens are nonreciprocal, the reflected energy will not be directed back toward the generator; it will be focused in a different direction at a different focal point and toward the anechoic chamber.

This concludes the description of specific embodiments of the present invention each including anode structure for conducting high frequency electrical waves along parallel substantially uncoupled paths and means for driving a space charge of electrons substantially transverse to these paths so that waves are amplified, the direction of amplification or gain being along the direction of conduction of the waves. One embodiment described includes anode structure into which waves are launched from a waveguide, and another includes anode structure into which a plane polarized space wave is launched. However, the invention should not be limited to either of these embodiments, and other arrangements of the wave conducting paths into which waves are launched in other manners could be substituted without deviating from the spirit and scope of the invention as set forth in the accompanying claims.

What is claimed is:

1. An electron discharge device comprising:
an anode structure;
said anode structure having a plurality of parallel axially-extending vanes defining a plurality of linear uncoupled electromagnetic wave conducting paths extending from opposite sides of a common support member;
means at the ends of said paths for causing the phase of waves in spaces between said vanes to change in value from space to space;
an electron emitting cathode structure coextensive with said anode structure defining a substantially continuous interaction space therebetween;
said interaction space viewed in cross-section having two parallel straight sections joined by curved sections with said anode vanes being provided at said straight sections;
means for establishing a magnetic field directed parallel to the axis of said anode structure and an electric field directed radially to said axis whereby the electrons form a space charge in the interaction space which circulates substantially circumferentially;
means for directing electromagnetic waves along the wave conducting paths in an axial direction to result in fringing electric fields between adjacent vanes extending into the interaction space;
said crossed magnetic and electric fields together with said fringing electric fields imparting a phase focusing effect to the electron space charge such that the crossover point of said space charge and traversed waves is in velocity synchronous relationship along a path coaxial to said linear wave paths whereby said waves are amplified by the net flow of energy from the electron space charge;
and a means for launching said amplified waves from the ends of each of said paths.

2. An electron discharge device comprising a plurality of devices according to claim 1 stacked in a vertical array so as to operate with a plane polarized electromagnetic wave directed to all wave conducting paths simultaneously.

3. An electron discharge device according to claim 1 wherein said cathode structure comprises a jacket member housing fluid coolant passageways.

4. In combination:
an electromagnetic wave generator comprising a source of high frequency energy and means for radiating said energy as linear polarized waves in space;
lens means comprising a plurality of nonreciprocal phase shifters responsive to said waves for focusing said energy in a planar wave front directed to amplifying means;
said amplifying means comprising:
an anode structure having a plurality of parallel axially-extending vanes defining a plurality of substantially uncoupled linear wave conducting paths arranged on opposite sides of a common wall;
means at the ends of said paths for causing the phase of waves in spaces between said vanes to change in value from space to space;
a cathode structure substantially coextensive with said wave conducting paths defining an interaction space therebetween;
means for establishing a magnetic field directed parallel to the axis of said anode structure and an electric field directed radially to said axis to cause electrons to form a space charge in the interaction space which circulates circumferentially;
means for directing the planar wave front simultaneously in all said wave paths to result in fringing electric fields between adjacent vanes extending into said interaction space;
said crossed magnetic and electric fields together with said fringing electric fields imparting a phase focusing effect to the electron space charge whereby the crossover point of the electron space charge and electromagnetic waves is in velocity synchronous relationship along a path coaxial to said wave paths to result in amplification of said waves by the net flow of energy from the electron space charge;
and means for launching said amplified waves toward a target.

References Cited by the Examiner

UNITED STATES PATENTS

| | | | |
|---|---|---|---|
| 2,310,294 | 2/1943 | Katzin | 325—14 |
| 2,530,826 | 11/1950 | Kock | 325—14 |
| 2,647,175 | 7/1953 | Sheer | 315—39.3 X |
| 2,687,777 | 8/1954 | Warnecke et al. | 315—3.6 X |
| 2,815,469 | 12/1957 | Sixsmith | 315—39.77 |
| 2,854,603 | 9/1958 | Collier et al. | 315—39.77 |
| 3,054,018 | 9/1962 | Paschke | 315—3.6 |
| 3,070,725 | 12/1962 | Lee et al. | 315—3.5 |
| 3,076,115 | 1/1963 | Smith | 315—3.5 |
| 3,082,351 | 3/1963 | Okress | 315—39.77 |
| 3,158,779 | 11/1964 | Ayaki | 315—39.3 |
| 3,188,518 | 6/1965 | Phillips | 315—39 |
| 3,206,635 | 9/1965 | Phillips | 315—39 |

HERMAN KARL SAALBACH, *Primary Examiner.*

DAVID G. REDINBAUGH, *Examiner.*

S. CHATMON, J. W. CALDWELL, *Assistant Examiners.*